No. 842,398. PATENTED JAN. 29, 1907.
W. GEBHARDT.
NUT CRACKING MACHINE.
APPLICATION FILED APR. 29, 1904.

William Gebhardt, Inventor

No. 842,398. PATENTED JAN. 29, 1907.
W. GEBHARDT.
NUT CRACKING MACHINE.
APPLICATION FILED APR. 29, 1904.

William Gebhardt, Inventor

Witnesses

No. 842,398. PATENTED JAN. 29, 1907.
W. GEBHARDT.
NUT CRACKING MACHINE.
APPLICATION FILED APR. 29, 1904.

William Gebhardt, Inventor

UNITED STATES PATENT OFFICE.

WILLIAM GEBHARDT, OF SAN ANTONIO, TEXAS.

NUT-CRACKING MACHINE.

No. 842,398.　　　Specification of Letters Patent.　　　Patented Jan. 29, 1907.

Application filed April 29, 1904. Serial No. 205,550.

*To all whom it may concern:*

Be it known that I, WILLIAM GEBHARDT, a citizen of the United States, residing at San Antonio, in the county of Bexar and State of Texas, have invented a new and useful Nut-Cracking Machine, of which the following is a specification.

This invention, while designed more particularly for cracking pecan-nuts, is undoubtedly capable of advantageous operation on nuts of various kinds, and its use is not limited in this respect. In order, however, to more clearly set forth the various features of the invention, it is hereinafter described in its relation to that class of nuts to which it is peculiarly adapted.

The flesh or meat of pecan-nuts removed from the shells is an article of commerce of growing importance. It is graded according to the size of the pieces, "halves" bringing a price twice as great as "quarters" and being four times as valuable as "eighths." Consequently it is a great desideratum to obtain the first-mentioned grade. In order to secure the meats in halves, the nuts have to be cracked in a careful and peculiar manner, and it will therefore be evident that a machine to be commercially successful must not only be able to thus crack the nuts, but to operate upon the same with rapidity.

Broadly stated, it is the object to provide such a machine.

One of the features therefore resides in the cracking mechanism *per se*, its peculiar construction which enables it to first properly position the nut prior to the cracking operation, and the means by which the efficient crushing of the shell is obtained with a minimum amount of breakage of the flesh contained therein.

Another feature relates to means whereby nuts may be operated upon in large numbers with rapidity and at the same time without sacrificing the successfulness of the said operation.

Still another feature is the feeding means, whereby the nuts are properly delivered, so that the desired cracking action upon the same is assured.

The embodiment of the invention which is at present considered preferable is illustrated in the accompanying drawings and is described in the following specification.

An inspection of the claims hereto appended will clearly indicate that the invention is not limited to the exact construction shown, but is open to various changes and modifications without in any manner departing from the spirit or sacrificing the advantages of said invention.

In the drawings.

Similar reference-numerals indicate corresponding parts in all the figures of the drawings.

In the embodiment illustrated a suitable base 15 is employed, having a discharge-opening 16 therethrough, in which is suitably mounted a receiving-hopper 17 for the cracked nuts, said hopper projecting above the base and being suitably flared. On opposite sides of the opening 16 and suitably secured to the base are supporting-standards 18 and 19, one of which is provided with a preferably integral supporting-spindle 20, extending over the opening 16 and across the top of the hopper 17. This spindle is preferably hollow, as shown, and its free end is received within a holding-ring 21, formed upon the upper end of the opposite standard 19.

Journaled upon the spindle 20 between the standards is a revoluble carrier constructed as follows: A drum 22 is provided and has a sleeve portion 23 abutting against an annular shoulder 24, formed on the periphery of the spindle adjacent to the standard 18. This sleeve carries at its free end a gear-wheel 25, constituting the means through which the carrier is revolved. The drum 22 is provided with annular outstanding flanges 26, and between the same said drum has transversely-disposed open-sided nut-receiving pockets 27, spaced at suitable intervals apart, openings 28 being formed through the flanges and alined with the pockets. The drum, furthermore, is provided on the side opposite the gear-wheel 25 with projecting studs 29, and suitably fastened to the free ends of the same by means of set-screws 30 is a disk 31, that is also journaled upon the spindle 20. The carrier thus described is rotated upon the spindle from a driving-shaft 32, journaled in posts 33, secured to the base and having a pinion 34 meshing with the gear-wheel 25. One end of the shaft projects beyond the base and is provided with suitable loose and tight pulleys 35, adapted to receive power from any suitable motor.

The gear-wheel 25 and the disk 31 are respectively provided with openings 36 and 37, equal in number to and alined with the openings 28 in the flanges of the drum. The said openings 28, 36, and 37 receive the cracking devices or members in the form of independent sets of oppositely-arranged plunger or shell-fracturing jaws that are thus slidably mounted on and revoluble with the carrier. In actual use a set of these jaws will be employed for each nut-receiving pocket; but in order to avoid confusion in the drawings some of these sets have not been shown. For instance, in the present case there are twelve pockets, and consequently twelve sets of alined openings, while four sets of plunger-jaws have been illustrated. As these sets are duplicates, it is thought that a description of one will be entirely sufficient.

Figures 1, 10, 11:
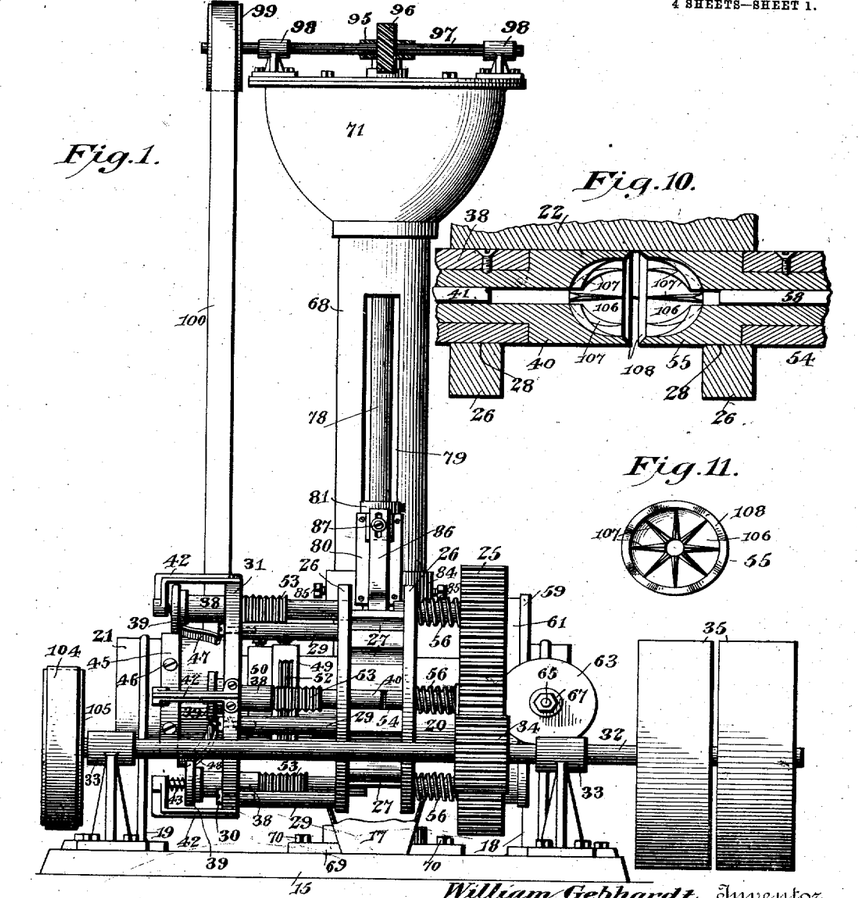
Figure 1 is a front elevation of the machine.
Fig. 10 is a detail sectional view, on an enlarged scale, through the coacting portions of a set of plunger-jaws.
Fig. 11 is an end elevation of one of said jaws.
Figures 5, 9:
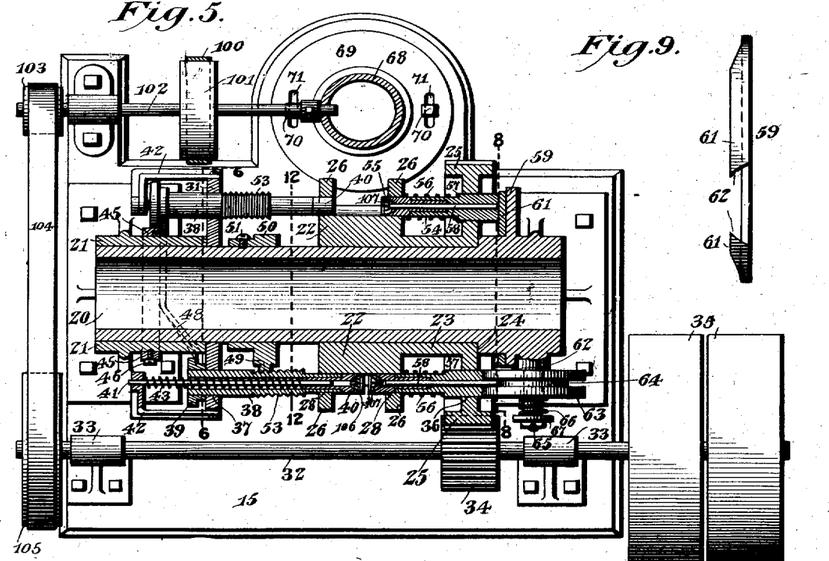
Fig. 5 is a horizontal sectional view through the machine.
Fig. 9 is an edge view of the other cam element employed.
Figures 6, 7:
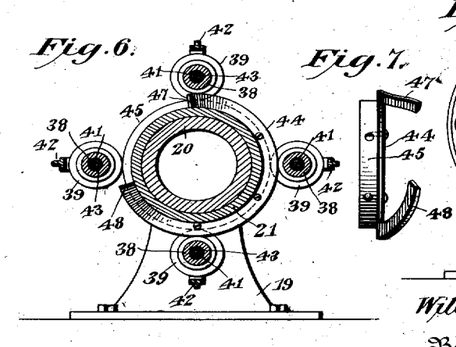
Fig. 6 is a sectional view taken substantially on the line 6 6 of Fig. 5.
Fig. 7 is an edge view of the retracting-cam.

Referring particularly to Figs. 5 and 10, it will be noted that the jaws of the set are in opposing relation. One of these (designated 38) is in the form of a tubular plunger having a slidable and a revoluble movement in certain of the openings 28 and 37. This plunger constitutes, in effect, the anvil member of the cracking set. It has on its outer end a flanged head 39, while its inner end carries a nut-engaging head or jaw 40. The plunger is slidably mounted on an expelling-stem 41, extending longitudinally within the same, the rear end of said stem being rigidly affixed to a bracket 42, that is secured to and carried by the disk 31. A coiled spring 43, mounted on the stem 41, bears at one end against the bracket 42, while its opposite end bears against the end of the cracking-head located in the bore of the plunger, thus serving to urge this plunger toward the opposite one. It is, however, retracted from said other jaw during the revolution of the carrier by means of a cam-track 44. (Shown particularly in Figs. 6 and 7.) The cam-track 44 is attached to a ring 45, secured by set-screws 46 against movement on the spindle-receiving ring 20 of the standard 19.

The outer end of the cam-track is adapted to engage the flange of the head 39 and has offset terminals 47 and 48, the latter of which is located in the path of movement of the head during its revolution with the carrier. Located between the ends 47 and 48 of the cam-track is a locking device in the form of a cam 49, having a hub 50, which is immovably attached to the spindle by a set-screw 51, said hub and cam being located between the disk 31 and the adjacent end of the drum. The cam 49 is provided on its projecting portion with suitable threads, or, more accurately, a plurality of ribs or shoulders 52, extending in the direction of rotation of the carrier. The jaw, which has already been described, is also provided with an annular series of these threads or shoulders, (shown at 53,) and during the rotation of said jaw for a certain period certain of the shoulders 53 thereof interlock with the shoulders 49 and prevent the sliding movement of the jaw upon the carrier. At the same time there is sufficient friction in this interlocking action to cause the revolution of the jaw in its bearings, the purpose of which is hereinafter pointed out. Referring now to the other jaw of the set, said jaw is designated generally by 54 and is also in the form of a tubular plunger carrying at its inner end a cracking-head 55, which coacts with the head 40 of the jaw above mentioned. The plunger 54 is slidably mounted in one of the alined sets of openings 28 and 36 and is urged outwardly or away from the jaw 38 by means of a spring 56, surrounding the plunger, one end bearing against the outer face of the drum 22, the other end bearing against a shoulder 57, formed upon the outer face of said plunger. An expelling-stem 58 is loosely fitted within the support of the plunger 54 and is adapted to project from the head 55 of the same.

Figure 8:
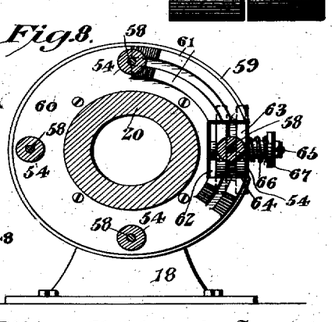
Fig. 8 is a sectional view taken substantially on the line 8 8 of Fig. 5.

The means for effecting the movement of the jaw or plunger 54 is very clearly and distinctly shown in Fig. 8. The main supporting-spindle 20 is provided contiguous to the standard 18 with an integral annular flange 59, to the inner side face of which is secured a cam-plate 60. The spring 56, already described, urges the rear or outer end of the plunger against this cam-plate, and said end therefore rides against the same during the revolution of the carrier. At a point opposite the space between the ends 47 and 48 of the cam-track 44, heretofore described, the cam-plate 60 is provided with curved and spaced tracks or guides 61, located in the path of movement of the said rear end of the plunger. Directly opposite the locking-cam 49 said cam-plate and disk are cut away, as shown at 62, to receive the inner portion of a crushing-wheel 63, that projects beyond the inner sides of the tracks or guides 61 and is peripherally grooved, as shown at 64, said groove alining with the space or groove formed between the tracks or guides. The wheel 63 is mounted on a stub-spindle 65, projecting from one side of the main supporting-spindle 20, or, in other words, at the upper end of the standard 18. Said wheel is not only revoluble upon the spindle, but has a lateral sliding movement thereon, being normally held against such movement, however, by a spring 66, coiled upon the outer end of the spindle and bearing against the wheel, the outer end of the spring bearing against a washer 67, fastened to the spindle. It will thus be apparent that during the revolution of the carrier the jaw will be held outwardly against the inner face of the cam-plate and will be brought against and ride upon the spaced tracks or guides 61. The expelling-stem 5 will, however, pass through the space between said tracks or guides and will not be operated, while the plunger or jaw itself will be moved inwardly. When said jaw reaches the wheel, it will be given a further inward movement; but as the outer end of the expelling-stem will enter the groove of the wheel it will still retain its original relations. The sliding movement of the wheel on its supporting-spindle is merely for the purpose of allowing the jaw to follow its curved path of movement without material interference.

The feeding mechanism will now be described.

Figures 2, 12, 13, 14, 15:
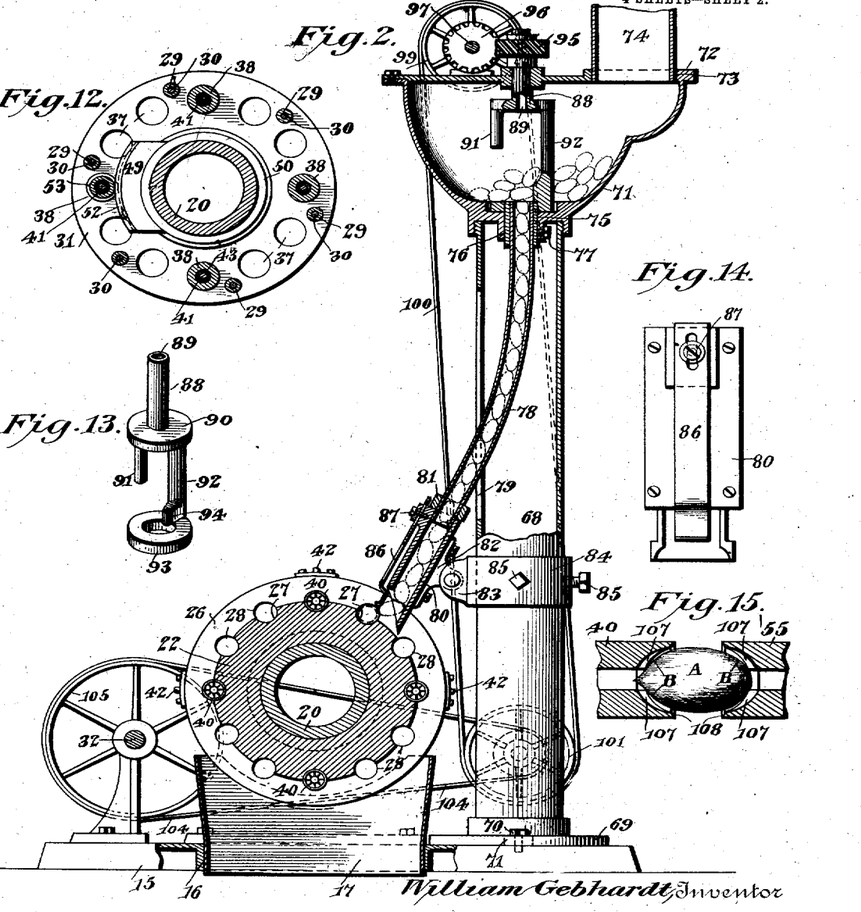
Fig. 2 is a vertical cross-sectional view therethrough.
Fig. 12 is a sectional view on the line 12 12 of Fig. 5.
Fig. 13 is a detail perspective view of the agitator employed.
Fig. 14 is a front elevation of the discharge or delivery nozzle.
Fig. 15 is a detail sectional view showing a nut in place in a set of jaws.
Figure 3:
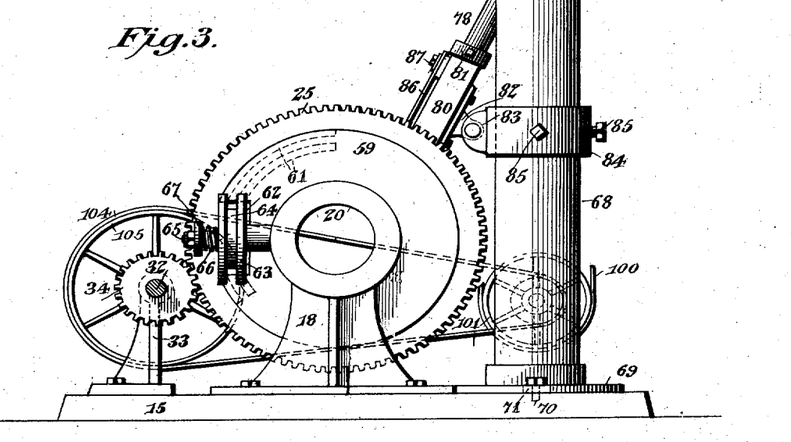
Fig. 3 is an elevation of one end of the machine with the upper portion of the standard and the hopper carried thereby broken away.
Figure 4:
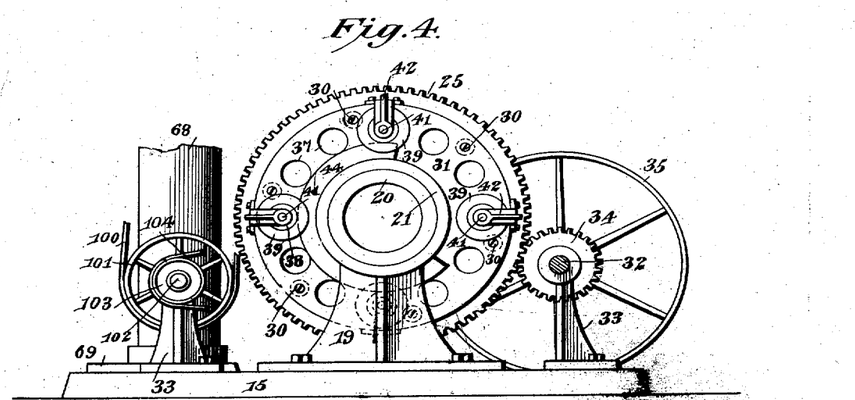
Fig. 4 is a similar view of the opposite end of the machine.

A hollow standard 68 is mounted in rear of the mechanism above described and has an enlarged flange 69 at its lower end, which rests upon the base 15, being secured thereon by set-bolts 70, that pass through slots 71, formed in the flange 69, and thus permit the bodily adjustment of the standard toward and from the carrier. This standard constitutes the entire support for the feeder. On its upper end is mounted a hopper 71, having a cover 72 detachably secured thereon, which cover is provided at one side with an opening 73, that receives the lower end of a chute 74, leading from a bin or other reservoir of nuts. The bottom of the hopper 71 is provided with a central discharge-opening 75, within which is fitted a sleeve 76, secured in place by a set-screw 77. The sleeve projects slightly above the bottom of the hopper to form a gudgeon and also receives the upper end of a conduit or spout 78, said conduit or spout being offset and passing through an opening 79, formed in one side of the standard. The lower end of the conduit fits within the upper end of a discharge-nozzle 80 and has adjustably secured thereto a supporting-collar 81, that rests upon the upper end of said nozzle. The nozzle 80 is preferably angular in cross-section and has an ear 82 pivotally associated with an ear 83, that forms a part of a collar 84, adjustably fastened by set-screws 85 about the standard. The ears 82 and 83, in effect, constitute a bracket connection between the collar and the nozzle. The lower end of said nozzle is preferably beveled or cut away, as shown, and is located directly over the drum between the flanges 26. The cut-away portion is partially covered by a yielding wall in the form of a spring 86, adjustably secured to said nozzle by a set-screw 87, the free lower end of said spring being preferably elevated a slight distance above the peripheral face of the drum, as shown in Fig. 2.

Mounted in the hopper 71 is an agitator comprising an upright shaft 88, journaled in the cover 72 directly above the discharge-opening 75 and having an opening or bore 89 therethrough, which is alined with the upper end of the conduit or spout 78. The inner end of the shaft 88 is provided with a cross-head 90, carrying depending arms 91 and 92 of different lengths, that rotate concentrically about the discharge-opening 75. The longer arm 92 is provided at its lower end with a journal-ring 93, rotatably mounted upon the gudgeon or upper end of the sleeve 76. This longer arm, furthermore, is provided contiguous to the ring with an inwardly-extending lug 94, that operates directly over said gudgeon. The upper exposed end of the shaft 88 is provided with a horizontally-disposed spiral gear 95, meshing with a similar gear 96, carried by a shaft 97, journaled in bearings 98 on the top of the hopper. This, it will be observed, leaves the upper end of the shaft 88 and the bore therethrough unobstructed. The shaft 97 projects at one end beyond the hopper and carries a pulley 99, over which runs a belt 100, that also passes about another pulley 101, secured to a shaft 102, journaled over the base 15 at the foot of the standard 68. The shaft 102 carries another pulley 103, that receives power from a belt 104, passing over a pulley 105 on the end of the driving-shaft 32 opposite the loose and tight pulleys 35.

A description of the operation of the machine may be prefaced by the remark that to secure the best results it is very desirable to have the nuts of substantially equal grade, so far as diameter is concerned. It is therefore the practice to pass said nuts through a suitable grader, which will sort them into three or more different sizes, and to employ a different machine properly adjusted for each size. Therefore, assuming that a quantity of properly-graded nuts have been introduced through the chute 74 to the hopper, as indicated in dotted lines in Fig. 2, said nuts will perhaps pass into the chute 78 and fill the same, though more than likely they will bank in the hopper, as the size of the chute is preferably just sufficient to permit the nuts to pass in only endwise, as indicated. Assuming now that power has been applied to the machine, it will be evident that the agitator will be rotated at a comparatively high speed, and consequently the nuts will be agitated within the hopper and because of the lug 94 will be consecutively positioned so as to drop into the chute 78 and thence into the nozzle. At the same time the drum 22 will be revolved, and the sets of cracking mechanisms or jaws will be revolved with it. When the jaws reach a position beneath the discharge of the nozzle, those on one side are held in retracted position against the tension of the spring by the cam-track 44, while the springs 56 of the others will in like manner hold the same outwardly against the face of the cam-plate 60. The nut-receiving pockets will therefore be open at this point, so that the nuts in the nozzle will drop successively into said pockets as they pass beneath the same and will lie on their sides therein, this movement being accomplished entirely by gravity. If for any reason an exceptionally long nut should become wedged at the lower end, the spring-wall 86 will "give" sufficient to allow the passage of the same, after which it will reassume its proper position. After the pockets have passed the feeding-nozzle the jaws on the right-hand side of the machine will first be successively pushed inwardly by the cam-tracks 61, thus clearing the inner ends of their expelling-stems, after which the left-hand jaws will be successively released from the cam-track 44 and under the action of their springs will move into the pockets, pushing the nuts contained therein against the right-hand jaws. Said nuts consequently act as stops to limit the inward movement of the left-hand jaws, and they are thus positioned and clamped between the jaws of the sets, ready for the next action—namely, the crushing or cracking of the shells. A further movement of the carrier will effect a successive engagement of the jaws on the left-hand side of the machine with the cam 49, or, in other words, the teeth of said cam will interlock with the alined teeth of said jaws, and consequently the latter will be held against their sliding movements on their carrier. At the same time this locking engagement is sufficient to cause a rotation of the jaws, thereby properly centering the nuts within the same. The continued movement of the carrier will thereupon cause the opposite jaws to pass successively over the inner portion of the wheel 63, and this wheel will effect a further inward movement of said jaws sufficient to crack the shells. As the carrier moves the sets of jaws beyond the operating mechanism the jaws of each set will successively separate, one being urged outward by its spring, the other being carried outward by riding outwardly upon the end 48 of the cam-track. The crushed or broken nut will thereupon be released and will drop into the receiving-hopper 17 and into a suitable receptacle placed below the same.

Should any portions of the nut stick in the jaws, it will be expelled therefrom by the inner ends of the expelling-stems 41 and 58, which, being relatively stationary, will project beyond the inner portions of the jaws when said jaws are in their outermost positions.

It is to be noted that practically all the elements of the cracking mechanism are detachably and freely adjustable, so that they can be properly positioned to perform their work. Each set of jaws is independent of the other, and these sets are successively operated, first, to clamp the nut, then to center it, afterward to crack the same, and finally to release it, the releasing action returning the jaws to a position to receive another nut, all these movements being successively effected upon consecutively-arranged sets of cracking devices. While in the present machine provision is shown for twelve sets of jaws, it will be be apparent that a greater or less number may be employed, as desired.

The successful feeding of the nuts to the carrier appears to be due to a variety of features. In the first place the gravitation of said devices rather than a forced feed is believed to be important. At the same time the feed is made practically positive by the agitator employed and, as has already been described, provision is made for abnormally-shaped nuts. In this respect it may be noted that in case a nut of large proportion should become wedged in the tube or spout 78 a wire can be passed through the bore 89 of the agitator-shaft and thence into the spout, so that such nut can be forced therefrom. If from such cause the feed of the nuts should be stopped, there will be no ill effect upon the cracking mechanisms, for, as shown in Fig. 5, the inward movement of the jaws on the left-hand side of the machine is stopped by the heads 39 engaging the disk 31, so that the jaws of the sets cannot be forced together. The various adjustments of the feeder, as heretofore described, is important, as the success of its operation depends to a great extent upon the proper disposition of the parts and their relation to the carrier. This can only be effected by experimenting and trying the same.

From what has gone before it is believed that the advantages of the machine will be apparent, particularly to those skilled in the art, for it will be seen that the device is capable of rapid and efficient operation and that the nuts will be properly positioned in the cracking-jaws before the shells are broken.

The description of the specific construction of the jaw-heads has been purposely withheld up to the present time, as the same constitutes an important factor and improvement in the art. The successful cracking of the shells without injury to the flesh of the nuts is due very materially to the construction of the portions of the jaws which actually engage the nuts, and the structure shown in detail in Figs. 10 and 11 is believed to be an important advance over that heretofore employed. It will be seen that the jaw-heads 40 and 55 are provided in their coacting ends with sockets 106 and that the walls of these sockets are continuously and correspondingly curved or concaved. Projecting from said walls are cutting-blades 107, which blades are wider and thicker at their inner ends than at their outer ends and taper from said inner ends continuously to said outer ends, their outer cutting edges being curved, as shown. The blades terminate short of the outer ends of the sockets, and said outer ends are flared or deflected, as shown at 108. As is well known, a pecan-nut has a large round end and a smaller pointed end. At least such are the ordinary nuts, averaging about ninety per cent., the remainder varying very considerably in shape. The shell is thicker at the ends than at the center and can stand more piercing than the intermediate portions. At the same time while said intermediate portions can stand a certain amount of bulging out before the flesh contained therein is broken a preliminary breakage at the center of the shell is almost sure to result in a breakage of the meat or flesh. Referring now to Fig. 15, wherein a nut A is illustrated in position in the jaws, experience has clearly demonstrated that to obtain the best results the cracks should be started at substantially the points B on the nut and that the shell would be pierced evenly on all sides. With the jaws illustrated the desirable action is secured to a very material degree, while the nut is not squeezed at these points. Furthermore, the cutting-blades can enter more deeply into the ends than at the sides and, having so entered there will be a proper crushing action throughout the end portions without abnormal and dangerous strains upon the central body. For these reasons the particular construction of the jaws is considered an important feature of the invention.

Having thus described my invention, what I claim as new, and desire to secure by Letters Patent, is—

1. In a nut-cracking machine, the combination with a plurality of nut-cracking mechanisms including shell engaging and fracturing devices, of means for successively operating the mechanisms.

2. In a nut-cracking machine, the combination with a plurality of cracking mechanisms including shell-fracturing devices, of operating means for the cracking mechanisms, said cracking mechanisms being movable past and into and out of engagement with the operating means to cause said means to operate successively and continuously on the different mechanisms and fracture the shells thereof while permitting a lateral expansion of the nuts.

3. In a nut-cracking machine, the combination with a plurality of independently-operating cracking mechanisms including coacting shell-fracturing devices, of common means for successively and continuously effecting the independent cracking operation of each mechanism.

4. In a nut-cracking machine, the combination with a plurality of cracking mechanisms including shell-fracturing devices, of means for effecting the cracking operation of each mechanism, said mechanisms being successively and repeatedly movable into coöperation with said operating means.

5. In a nut-cracking machine, the combination with a movable support, of cracking mechanisms including shell engaging and fracturing devices mounted thereon, and operating means for the cracking mechanisms, said support being movable to carry the cracking mechanisms successively into coöperation with the operating means, and said means operating successively on the cracking mechanisms to effect the movement of the shell-fracturing devices to engage and crack the nuts.

6. In a nut-cracking machine, the combination with a movable support, of a plurality of independent cracking mechanisms mounted thereon and movable therewith, said mechanisms including relatively movable shell engaging and fracturing devices, operating means for effecting the cracking operations of said mechanisms, and means for moving the support to carry the cracking mechanisms mounted thereon successively into coöperation with said operating means.

7. In a nut-cracking machine, the combination with a revoluble support, of a plurality of separate cracking mechanisms mounted thereon and revoluble therewith, said mechanisms including relatively movable shell engaging and fracturing devices, and operating means for the cracking mechanisms, said mechanisms being successively carried into coöperative relation with the operating means upon the revolution of the support.

8. In a nut-cracking machine, the combination with a revoluble support, of nut-cracking mechanisms mounted thereon and revoluble therewith, said mechanisms including relatively movable shell engaging and fracturing devices, operating means for the cracking mechanisms, means for feeding nuts to the mechanisms, and means for continuously revolving the support to carry said cracking mechanisms successively and repeatedly into coöperative relation with said operating means and thereby successively effect the relative movements of the fracturing devices to crack the nuts.

9. In a nut-cracking machine, the combination with a carrier, of means for feeding nuts thereto, nut-cracking mechanism mounted on the carrier and having shell-fracturing means, means for operating the mechanism to crack the nuts, and means for moving the carrier and mechanism to a position to receive a nut from the feeding means and from such position to a position to effect the movement of the cracking mechanism by the operating means.

10. In a nut-cracking machine, the combination with a movable nut-carrier, of a plurality of nut-cracking mechanisms movable therewith and including shell-fracturing means, means for successively operating the mechanisms to cause the fracturing means to properly engage and crack the nuts in the carrier, and means for moving the carrier and for moving the nut-cracking mechanisms successively into coöperation with the operating means.

11. In a nut-cracking machine, the combination with nut-feeding means, of a revoluble support and nut-carrier coacting therewith, nut-cracking mechanism movably mounted on and movable with the support, said mechanism including nut-engaging and shell-fracturing means, and operating means for moving the mechanism upon the support, said support upon its revolution carrying the said mechanism into coöperative relation with the operating means.

12. In a nut-cracking machine, the combination with nut-feeding means, of a revoluble support movable with respect thereto, a plurality of separate nut-cracking mechanisms movably mounted on and revoluble with the support, said mechanisms including relatively movable nut-engaging and shell-fracturing means, operating means for moving the nut-cracking mechanisms upon the support to crack the nuts fed thereto, and means for revolving the said support to carry the mechanisms successively and repeatedly past the feeding means and into coöperative relation with the operating means to continuously crack nuts.

13. In a nut-cracking machine, the combination with a revoluble carrier, of nut-cracking mechanism movably mounted thereon and revoluble therewith, said mechanism including relatively movable coacting shell-fracturing means arranged to engage the nuts and at the same time permit the lateral expansion thereof, and operating means for the nut-cracking mechanism located in the path of revolution of the cracking mechanism.

14. In a nut-cracking machine, the combination with nut-feeding means, of a revoluble carrier, a plurality of independently-operating nut-cracking mechanisms revoluble with the carrier and including relatively movable shell-fracturing devices arranged to engage the opposite ends of the nuts and permit of their lateral expansion under pressure, and operating means for successively moving the mechanisms, said means being located in the path of revolution of the cracking mechanisms.

15. In a nut-cracking machine, the combination with a rotatable carrier including a drum having nut-receiving pockets, of a plurality of nut-cracking mechanisms having shell-fracturing means movably mounted on the carrier and revoluble therewith, and means for actuating the mechanisms to move said fracturing means in the pockets and crack the nuts therein while permitting of their lateral expansion.

16. In a nut-cracking machine, the combination with a rotatable carrier including a drum having open-ended and open-sided nut-receiving pockets, of means for successively feeding nuts to the open sides of the pockets, a plurality of nut-cracking mechanisms movably mounted on the carrier and revoluble therewith, said mechanisms comprising sets of shell-fracturing jaws movable through the open ends of the pockets and permitting the expansion of the shells under pressure, and means for successively moving the jaws into the pockets during the revolution of the carrier for cracking the nuts therein and at the same time permitting of their lateral expansion.

17. In a nut-cracking machine, the combination with a movable flanged carrier having pockets between the flanges and openings through said flanges alined with the pockets, of supports located outside the flanges, plungers slidably mounted in the supports and having coacting shell-fracturing jaws movable through the openings in the flanges and into the pockets.

18. In a nut-cracking machine, the combination with a rotatable carrier including a drum having spaced flanges and supporting-disks located outside the flanges, said drum being provided with pockets between the flanges, and openings through said flanges that are alined with the pockets, of nut-cracking mechanisms movably mounted on the disk and drum and comprising sets of shell-fracturing jaws movable through the openings in the flanges and into the pockets, and means for successively effecting the movement of the jaws into the pockets to effect the cracking of the nuts while permitting of their lateral expansion.

19. In a nut-cracking machine, the combination with a movable carrier, of relatively movable nut-fracturing jaws movably mounted on and movable with the carrier, means for effecting the preliminary relative movement of the jaws to position the same upon nuts of different sizes, and means for effecting the relative movement of the jaws to fracture the shell of such nut, both of said means successively operating on the jaws upon the movement of the carrier.

20. In a nut-cracking machine, the combination with a movable carrier, of relatively movable nut-fracturing jaws movably mounted on and movable with the carrier, means for effecting the preliminary yielding and relative movement of the jaws to position the same upon a nut, and means for effecting the relative unyielding movement of the jaws to fracture the shells, both of said means successively operating on the jaws upon the movement of the carrier.

21. In a nut-cracking machine, the combination with a movable carrier, of relatively movable nut-fracturing jaws movably mounted on and movable with the carrier, means for effecting a preliminary relative movement of the jaws to position the same upon nuts of different sizes, locking means for holding one of the jaws against movement, and means for effecting the relative movement of the jaws to fracture the shell of such nut, said means successively operating on the jaws upon the movement of the carrier.

22. In a nut-cracking machine, the combination with a rotatable carrier, of relatively movable nut-fracturing jaws movably mounted on and movable with the carrier, said jaws being arranged to receive a nut between them, means for effecting a preliminary yielding movement to one of the jaws, a lock for holding the yieldingly-moved jaw against retrograde movement, and means for effecting the relative unyielding movement of the jaws to fracture the shells, said means successively operating on the jaws upon the movement of the carrier.

23. In a nut-cracking machine, the combination with a movable carrier, of oppositely-located nut-fracturing jaws movable on and with the carrier and arranged to receive a nut between them, a spring for urging one jaw toward the other to thereby position the jaws upon nuts of different sizes, a lock for holding the spring-pressed jaw against movement, and means for relatively moving the jaws when the spring-pressed jaw is locked to effect the fracture of the shell of the nut, said movements being effected during the movement of the carrier.

24. In a nut-cracking machine, the combination with a rotatable carrier, of oppositely-located shell-fracturing jaws movably mounted on the carrier and arranged to receive a nut between them, a spring for urging one of the jaws toward the other, and means for effecting the following operations of said jaws in the order named: first, separating the jaws to permit the introduction of a nut between them; second, releasing the spring-pressed jaw to position said jaws upon a nut; third, locking the spring-pressed jaw against retraction; fourth, effecting an inward movement of the other jaw to fracture the shell of the nut; fifth, retracting said jaws to release the cracked nut.

25. In a nut-cracking machine, the combination with a movable nut-holding carrier, of relatively movable shell-fracturing jaws movably mounted on and movable with the carrier, means for locking one of the jaws in a variety of positions to engage nuts of different sizes, said means being located at a predetermined point in the path of movement of the jaw and said jaw being moved into engagement therewith on the movement of the carrier, and means for operating the other jaw to fracture the shells while the first-mentioned jaw is locked.

26. In a nut-cracking machine, the combination with a movable carrier, of relatively movable shell-fracturing jaws movably mounted on and movable with the carrier, means for effecting a variable movement of one of the jaws to engage the same on nuts of different sizes, means for locking said jaw in any of a plurality of different positions, and means for operating the other jaw after the first-mentioned jaw is locked to fracture the shells, said operating means being located in the path of movement of the second jaw and engaged thereby on the movement of the carrier.

27. In a nut-cracking machine, the combination with a movable carrier, of relatively movable shell-fracturing jaws movably mounted on and movable with the carrier, means for effecting a variable preliminary relative movement of the jaws to clamp nuts of different sizes therebetween, means for afterward locking one of the jaws in any of a plurality of positions, said means being located in the path of movement of said jaw and said jaw being moved into engagement therewith on the movement of the carrier, and means for operating the other jaw after the first-mentioned jaw is locked to fracture the shells, said operating means being located in the path of movement of the second jaw and engaged thereby on the movement of the carrier.

28. In a nut-cracking machine, the combination with a movable carrier, of relatively movable shell-fracturing jaws movably mounted on and movable with the carrier, means located at one point in the path of movement of one of the jaws for locking said jaw in any of a plurality of positions upon the carrier, said jaw being consecutively moved into and out of engagement with the locking means on the movement of the carrier, and means for operating the other jaw to fracture the shells after the first-mentioned jaw is locked, said means being located in the path of movement of the second jaw and engaged thereby on the movement of the carrier.

29. In a nut-cracking machine, the combination with a revoluble carrier, of relatively movable shell-fracturing jaws mounted on and revoluble with the carrier, means located at a predetermined point for locking one of the jaws in any of a plurality of positions upon the carrier and in engagement with nuts of different sizes, and means for effecting the movement of the other jaw to fracture the shell of said nut while the first-mentioned jaw is locked, said locking and said moving means being located in the paths of movement of the jaws.

30. In a nut-cracking machine, the combination with a revoluble carrier, of relatively movable oppositely-arranged shell-fracturing jaws slidably mounted on the carrier, means located at a predetermined point for holding one of the jaws against sliding movement in any of a plurality of positions and in engagement with nuts of different sizes, said means being located in the path of movement of said jaw, operating means for moving the other jaw while the first-mentioned jaw is locked, to fracture the shells of the nuts, said operating means being located in the path of movement of the jaw, and means for revolving the carrier to carry the jaws into coacting engagement with their locking and operating means respectively.

31. In a nut-cracking machine, the combination with a movable carrier, of a plurality of nut-cracking mechanisms mounted thereon, each mechanism comprising relatively movable oppositely-arranged shell-fracturing jaws slidably mounted on the carrier, yielding means for moving one of the jaws of each set, common means for successively holding said yieldingly-operated jaws against a sliding movement, said means being located in the path of movement of said jaws, means for successively moving the other jaws of the sets while the first-mentioned jaws are locked, said operating means being located in the path of movement of the jaws moved thereby, and means for moving the carrier to carry the jaws successively into coacting engagement with their locking and operating means respectively.

32. In a nut-cracking machine, the combination with a revoluble carrier, of sets of relatively movable shell-fracturing jaws slidably mounted on and revoluble with the carrier, means located at a predetermined point in the path of movement of one of the jaws of each set and having an interlocking engagement with said jaws for holding the same against sliding movement and in any of a plurality of positions, means for automatically effecting variable inward movements of said jaws prior to their being locked, means for moving the other jaw of each set while the first-mentioned jaw is locked, said moving means being also located in the path of movement of the jaw operated thereby, and means for revolving the carrier to successively carry the sets of jaws into coacting engagement with the locking and operating means.

33. In a nut-cracking machine, the combination with a movable carrier, of a stationary locking device, and nut-cracking mechanism having shell-fracturing means and including a nut-engaging member carried by the carrier into and out of engagement with the locking device, and means for effecting the movement of the member when disengaged from the locking device, said means effecting a yielding movement of the member in one direction.

34. In a nut-cracking machine, the combination with a revoluble carrier, of nut-cracking mechanism comprising relatively movable members mounted on the carrier, means for yieldingly moving one of said members on the carrier toward the other member, and a stationary locking device, said yieldingly-operated member being moved by the carrier into and out of engagement with the locking device for holding it against yielding movement.

35. In a nut-cracking machine, the combination with a movable carrier having nut-holding means, of a stationary locking device having a plurality of shoulders, and nut-cracking mechanism movably mounted on the carrier and comprising relatively movable members, one of said members having a plurality of shoulders that are carried into interlocking engagement with the shoulders of the locking device on the movement of the carrier.

36. In a nut-cracking machine, the combination with a revoluble carrier, of nut-cracking means including a movable shell-fracturing jaw mounted on the carrier and having shoulders, a spring for effecting a variable movement of the jaw to engage upon nuts of different sizes, and a device located adjacent to the carrier and having shoulders which are interlocked with the shoulders of the jaw during the revolution of the carrier and during the nut-cracking operation, to hold the jaw in any of a plurality of positions.

37. In a nut-cracking machine, the combination with a supporting-spindle, of a carrier revolubly mounted thereon, a shell-fracturing jaw slidably mounted on the carrier longitudinally of the spindle, and a stationary cam that interlocks with the jaw during the revolution of the carrier and during the shell-fracturing operation to secure said jaw in any of a plurality of positions.

38. In a nut-cracking machine, the combination with a supporting-spindle, of a carrier revolubly mounted thereon, a cam rigidly secured to the spindle and having shoulders, a shell-fracturing jaw slidably mounted on the carrier longitudinally of the spindle, and having shoulders that detachably interlock with the shoulders of the cam, and means for effecting a variable movement of the jaw prior to its said interlocking engagement.

39. In a nut-cracking machine, the combination with a movable carrier, of a locking device, and a plurality of spring-operated cracking members movably mounted on the carrier and movable therewith, said cracking members successively engaging the locking device and being thereby held against their spring movements.

40. In a nut-cracking machine, the combination with a support, of a carrier revolubly mounted on the support, a locking device secured to the support, a plurality of cracking members movably mounted on the carrier and revoluble therewith, and means for yieldingly moving the cracking members on the support to engage nuts of different sizes, said cracking members successively interlocking with said locking device after their yielding movements and being thereby held against such yielding movements during a portion of the revolution of the carrier.

41. In a nut-cracking machine, the combination with a supporting-spindle, of a carrier revolubly mounted on the spindle, a cam secured to the spindle, a plurality of nut-cracking jaws slidably mounted on the carrier and revoluble with the same, and means for yieldingly moving the jaws on the carrier to engage nuts of different sizes, said jaws successively interlocking with the cam and being thereby each held against yielding movement in any of a plurality of positions.

42. In a nut-cracking machine, the combination with a movable carrier, of coacting jaws mounted on the carrier and relatively movable thereon, means for automatically effecting a variable relative movement of the jaws to engage them on nuts of different sizes, and means for afterward effecting a further relative movement to crack the nuts so engaged.

43. In a nut-cracking machine, the combination with a rotatable carrier, of sets of coacting jaws mounted on the carrier, the jaws of each set being relatively movable, means for automatically and successively effecting a variable relative movement between the jaws of each set to engage them on nuts of different sizes, and means for afterward effecting a further fixed relative movement of the jaws to crack the nuts, said sets of jaws being consecutively actuated during the rotation of the carrier.

44. In a nut-cracking machine, the combination with a movable carrier, of a nut-cracking member movably mounted thereon, automatically-adjustable means for holding nuts of different sizes against the nut-cracking member, and means for effecting the movement of the member to crack the nuts held thereagainst during the movement of the carrier.

45. In a nut-cracking machine, the combination with a rotatable carrier, of a plurality of nut-cracking members movably mounted thereon, automatically-adjustable means for holding nuts of different sizes against the nut-cracking members, said means including devices movably mounted on the carrier and rotatable therewith, and means for effecting the successive movement of the members to crack the nuts held thereagainst during the rotation of the carrier.

46. In a nut-cracking machine, the combination with a rotary drum, having open-sided nut-receiving pockets, of sets of relatively movable nut-cracking jaws mounted on the drum and operating in the pockets, and means for effecting an unyielding relative movement of the jaws inwardly to crack nuts located between them and in the pockets.

47. In a nut-cracking machine, the combination with a rotary drum having open-sided nut-receiving pockets, of sets of relatively movable nut-cracking jaws movably mounted on the drum and operating in the pockets, means for feeding nuts into the pockets between the jaws, means for effecting the variable movement of one jaw of each set to clamp the nuts against the other jaws, means for successively locking the jaws so moved in their variable positions, and means for successively moving the said other jaws to crack the clamped nuts.

48. In a nut-cracking machine, the combination with a movable carrier having nut-receiving means, of nut-cracking means mounted on the carrier and including a nut-cracking member movably mounted thereon and carried thereby, means for first moving said member into binding engagement with a nut placed in the receiving means, and a movable operating device located in the path of movement of the member for afterward effecting an unyielding movement thereof upon the carrier to crack the nut, said member being carried into engagement with the operating device by the carrier.

49. In a nut-cracking machine, the combination with a movable carrier, of nut-cracking means mounted on the carrier and including a nut-cracking member movably mounted thereon and carried thereby, means for effecting a preliminary movement of the member to first engage the same with a nut, and an operating-wheel located in the path of movement of the member for afterward moving the same upon the carrier to crack the nut, said member being carried into engagement with the wheel by the carrier.

50. In a nut-cracking machine, the combination with a revoluble carrier, of nut-cracking mechanisms including a plurality of nut-cracking jaws movably mounted on the carrier, means for successively effecting preliminary movements of the jaws to engage the same with nuts to be cracked, and an operating-wheel located in the path of movement of the jaws and successively sliding the same upon the carrier after the said preliminary movements to crack the nuts during the revolution of said carrier.

51. In a nut-cracking machine, the combination with a revoluble carrier, of nut-cracking mechanism including a nut-cracking jaw slidably mounted on and revoluble with the carrier, means for feeding nuts to the carrier in front of the jaw, a stationary cam-track located in the path of movement of the jaw during the revolution of the same for effecting a preliminary movement of the jaw on the carrier to position said jaw upon a nut, and an operating-wheel also located in the path of movement of the jaw and in rear of the cam-track and engaging the same during the revolution of the carrier and jaw for the purpose of sliding the jaw upon the carrier to fracture the shell of the nut.

52. In a nut-cracking machine, the combination with a revoluble carrier, of nut-cracking mechanism including a nut-cracking jaw slidably mounted on the carrier and revoluble therewith, and an actuating device located alongside the carrier and engaging the jaw to move the same upon the carrier during the revolution of said carrier, said device being movable toward and from the axis of revolution of the carrier.

53. In a nut-cracking machine, the combination with a revoluble carrier, of a plurality of cracking-jaws slidably mounted thereon, and an actuating device successively engaged by the jaws during the revolution of the carrier, said device being movable toward and from the axis of revolution of the carrier, to permit the passage of said jaws.

54. In a nut-cracking machine, the combination with a revoluble carrier, of a plurality of nut-cracking jaws slidably mounted thereon and revoluble therewith, and an operating-wheel for successively engaging the jaws to move the same upon the carrier, said wheel having a slidable movement to permit the free passage of the jaws thereover.

55. In a nut-cracking machine, the combination with a revoluble carrier, of a plurality of nut-cracking jaws slidably mounted thereon and revoluble therewith, a stem located at the side of the carrier, an operating-wheel slidably mounted on the stem and having a portion of its periphery in the path of movement of the jaws, and a spring bearing against the wheel.

56. In a nut-cracking machine, the combination with a movable carrier, of a nut-cracking jaw movably mounted thereon and movable therewith, means mounted in the path of movement of the jaw for moving the same in one direction upon the carrier, first to position the jaw upon a nut and afterward to crack such nut, said jaw being carried by the carrier into engagement with the said means, and means for moving the jaw in an opposite direction to release the nut after the same has been cracked.

57. In a nut-cracking machine, the combination with a movable carrier, of a nut-cracking jaw movably mounted thereon and movable therewith, an operating device mounted in the path of movement of the jaw for moving the same in one direction upon the carrier to crack a nut, said jaw being carried by the carrier into engagement with the operating device, and a spring carried by the jaw and movable therewith, said spring automatically moving the jaw in an opposite direction to disengage the jaw from the nut after the same has been cracked.

58. In a nut-cracking machine, the combination with a revoluble carrier, of a plurality of jaws slidably mounted thereon and revoluble therewith, an actuating member located in the path of movement of the jaws and successively operating upon the same to effect their movement in one direction for the purpose of engaging and properly cracking the nuts, and separate springs mounted on the jaws for moving said jaws in an opposite direction after their operation by the actuating member.

59. In a nut-cracking machine, the combination with a movable nut-carrier, of a tubular nut-cracking jaw slidably mounted on the nut-carrier and movable therewith, said jaw having shell-fracturing means acting upon the nuts placed on said carrier, during the movement of said carrier, an expelling-stem mounted on the jaw, and means located in the path of movement of the jaw and engaged thereby during the movement of the carrier to move the jaw upon the carrier and actuate the fracturing means to break the shells of the nuts, said means being located out of the path of movement of the stem.

60. In a nut-cracking machine, the combination with a support, of a nut-cracking jaw slidably mounted thereon and having shell-fracturing means, an expelling-stem located within the jaw and relatively movable with respect thereto, spaced cam-tracks for effecting the movement of the jaw, the space between said tracks being arranged to receive the stem to permit the same being stationary during the movement of the jaw, and means for effecting a relative movement between the support and cam-tracks.

61. In a nut-cracking machine, the combination with a support, of a nut-cracking jaw slidably mounted thereon and having shell-fracturing means, an expelling-stem mounted in the jaw and relatively stationary with respect thereto, a grooved operating-wheel for effecting the movement of the jaw, the groove of said wheel being arranged to receive a portion of the stem to permit the same remaining stationary during the movement of the jaw, and means for effecting a relative movement between the support and wheel to effect an engagement between the jaw and wheel.

62. In a nut-cracking machine, the combination with a movable carrier, of a plurality of tubular nut-cracking jaws slidably mounted thereon and having shell-fracturing means, expelling-stems extending through the jaws, and a cam member located in the path of movement of the jaws and having a groove that receives the stems.

63. In a nut-cracking machine, the combination with a revoluble carrier, of a plurality of slidable jaws mounted thereon and revoluble therewith, expelling-stems located within the jaws, a cam member having spaced tracks disposed in the path of movement of the jaws for effecting their sliding movement on the carrier during the revolution of the same, the space between the tracks being arranged to receive the adjacent ends of the expelling-stems, and a grooved wheel for effecting the further movement of the jaws upon the carrier, the groove of said wheel being also arranged to receive the adjacent ends of the stems.

64. In a nut-cracking machine, the combination with a revoluble carrier, comprising a drum having nut-receiving pockets and an outstanding flange, of a gear-wheel connected with the drum and spaced from the flange, nut-cracking jaws slidably mounted in the flange and gear-wheel, and means for effecting the sliding movements of the jaws.

65. In a nut-cracking machine the combination with a movable carrier, of nut-cracking mechanism including a cracking member movably mounted thereon and movable therewith, a spring for urging the member in into engagement with a nut placed on the carrier, a cam element having spaced terminals, said cam element having its terminals located in the path of movement of the cracking member and moving the same against the tension of the spring, and a locking device for holding the member when disengaged from the cam, said device being located in the path of movement of the cracking member and disposed in line with the space between the terminals of the cam element.

66. In a nut-cracking machine, the combination with a revoluble carrier, of a plurality of nut-cracking members slidably mounted thereon and revoluble therewith, a stationary cam-track having offset spaced terminals disposed in the path of movement of the cracking members, and a stationary locking device located in line with the space between the terminals of the cam-track, and interlocking with the members to hold the same in any of a plurality of positions, said cracking members being carried into engagement with the cam-track and locking device by the revolution of the carrier.

67. In a nut-cracking machine, the combination with a movable carrier, of coacting nut-cracking members having shell-fracturing means, one of said members having a slidable and revoluble movement thereon to engage and properly position itself upon a nut, said member being movable with the carrier, means for effecting the sliding and revoluble movements of the member upon the carrier, and means for effecting the relative movements of the members to crack the nut positioned therebetween.

68. In a nut-cracking machine, the combination with a movable carrier, of a set of relatively movable oppositely-arranged jaws slidably mounted on and movable with the carrier, a spring for urging one of the jaws toward the other, means for moving the jaw against the tension of the spring, a lock for holding said jaw after its movement by the spring, and means for moving the other jaw after the first-mentioned jaw has been locked, said means and lock being located in the path of movement of the jaws and said jaws being carried into engagement thereby upon the movement of the carrier.

69. In a nut-cracking machine, the combination with a revoluble carrier, of a plurality of sets of independent jaws slidably mounted on the carrier and revoluble therewith, a spring for urging one jaw of each set toward the other jaw, a lock located in the path of movement of the jaws for successively holding the same against movement on the carrier, means for successively moving the other jaws toward the first-mentioned jaws while locked, and means for withdrawing said first-mentioned jaws after the same are unlocked, said means and lock being disposed in the path of movement of the jaws and said jaws being moved into engagement therewith during the revolution of the carrier.

70. In a nut-cracking machine, the combination with a stationary spindle, of a carrier journaled thereon and comprising a flanged drum having a plurality of nut-receiving pockets, supporting devices disposed outside the flanges of the drums and in spaced relation thereto, independent sets of nut-cracking jaws slidably mounted in the supporting devices and flanges and revoluble with the carrier, a spring carried by one jaw of each set for urging the same into a pocket of the drum, a stationary locking device arranged in the path of movement of said jaws for holding the same against movement, a cam for moving the opposite jaws toward the first-mentioned jaws when so locked, said cam being stationary, and a cam for successively withdrawing the first-mentioned jaws from the pockets after the same have been unlocked.

71. In a nut-cracking machine, the combination with a movable carrier, of oppositely-disposed coacting nut-cracking jaws movably mounted on and movable with the carrier, means for locking one of said jaws at a predetermined point in its movement in any of a plurality of positions with relation to the other, and means for effecting the movement of said other jaw while the first is thus locked to crack a nut placed between the jaws.

72. In a nut-cracking machine, the combination with a rotatable nut-carrying drum, of a plurality of sets of oppositely-coacting jaws movably mounted on and rotatable with the drum, the jaws of each set being arranged to receive nuts of different sizes between them, means for locking one of said jaws of each set at a predetermined point in its movement in any of a plurality of positions with relation to the coacting jaw, and means for effecting the movement of said other jaws toward the first-mentioned jaws while the same are locked.

73. In a nut-cracking machine, the combination with a movable carrier, of oppositely-disposed coacting jaws movably mounted on the carrier, a spring for moving one jaw inwardly, a spring for moving the other jaw outwardly, means for effecting the positive movements of said jaws against the action of their springs, and means for locking one of the jaws against movement while the other is being positively moved.

74. In a nut-cracking machine, the combination with a base, of a nut-carrier movably mounted on the base, nut-cracking means movably mounted on and movable with the carrier, a support located on the base and extending above the carrier adjacent thereto, and nut-feeding means located on the support said nut-feeding means delivering the nuts to the carrier and in position to be acted on by the nut-cracking means.

75. In a nut-cracking machine, the combination with a base, of a revoluble nut-carrier journaled on the base, nut-cracking means movably mounted on and movable with the carrier, a standard mounted on the base at one side of the carrier and extending above the same, and nut-feeding means located on the support and delivering nuts to the carrier in position to be acted on by the nut-cracking means.

76. In a nut-cracking machine, the combination with a base, of a rotatable nut-carrier movably mounted on the base, sets of coacting cracking-jaws movably mounted on and movable with the carrier, a standard mounted on the base, a hopper carried by the standard, and means for delivering nuts from the hopper to the carrier between the cracking-jaws.

77. In a nut-cracking machine, the combination with a base, of mechanism for cracking nuts mounted on the base, a supporting-standard mounted on the base and extending above the cracking mechanism, a feeder for the cracking mechanism mounted on the standard above said cracking mechanism and including a delivery-spout, and means adjustably connecting the standard and spout for adjusting the latter with respect to the nut-cracking mechanism.

78. In a nut-cracking machine, the combination with a base, of nut-cracking mechanism mounted on the base, a feeder for the mechanism including a delivery-spout coacting with the cracking mechanism, a supporting-standard mounted on the base and carrying the feeder, said standard being adjustable toward and from the cracking mechanism, and means adjustably connecting the standard and spout to vary the position of said spout with respect to the cracking mechanism.

79. In a nut-cracking machine, the combination with a base-support, of nut-cracking mechanism movably mounted thereon and including a movable carrier and nut-cracking jaws movable thereon and therewith, a standard mounted on the base, a hopper supported on the standard, a delivery-spout extending longitudinally of the standard, and a nozzle carried by the lower end of the spout and delivering the nuts to the carrier.

80. In a nut-cracking machine, the combination with nut-cracking mechanism including a movable carrier and movable coacting jaws carried thereby, of a standard located adjacent to the cracking mechanism, a hopper mounted on the upper end of the standard, a delivery-spout connected with the lower end of the hopper and extending downwardly, and a discharge-nozzle carried by the lower end of the spout and delivering to the upper portion of the carrier between the jaws.

81. In a nut-cracking machine, the combination with a movable nut-carrier, of a hollow standard located adjacent thereto, a hopper mounted on the upper end of the standard, a delivery-spout connected with the bottom of the hopper and extending downwardly at one side of the standard, a discharge-nozzle carried by the lower end of the spout and located over the nut-carrier, and an adjustable bracket connection between the standard and the nozzle, for varying the position of the latter with respect to the carrier.

82. In a nut-cracking machine, the combination with a nut-receiving hopper, of a support for the same, nut-cracking mechanism located lower than the hopper, a spout leading from the hopper to the mechanism, and an adjustable bracket connection between the support and the spout to vary the position of the spout with respect to the nut-cracking mechanism.

83. In a nut-cracking machine, the combination with a hopper, of a standard for supporting the same, nut-cracking mechanism located lower than the hopper, a spout leading from the hopper to the mechanism, a collar surrounding the standard, and a hinge connection between the collar and the spout to permit the variation of the position of the spout with respect to the nut-cracking mechanism.

84. In a nut-cracking machine, the combination with a movable nut-carrier, of cracking mechanism coacting therewith, feeding means therefor including a nozzle having a delivery end coacting directly with the carrier, said end having one side cut away, and a yielding wall portion covering said cut-away side and movable outwardly under abnormal pressure from a nut engaged in the carrier.

85. In a nut-cracking machine, the combination with a movable nut-carrier, of nut-cracking mechanism coacting with the carrier, a standard located at one side of the same, a hopper supported on the standard, a tubular nozzle secured to the lower portion of the standard and disposed contiguous to the carrier, said nozzle delivering directly to the carrier, and a conduit leading from the hopper and having its lower end inserted in the upper end of the nozzle.

86. In a nut-cracking machine, the combination with a revoluble nut-carrier drum having nut-receiving pockets, of a standard located at one side of the same, a hopper supported on the standard, a nozzle adjustably secured to the standard and having a spring-wall, said nozzle being located over the nut-carrier, and a conduit connecting the hopper and the nozzle.

87. In a nut-cracking machine, the combination with a movable nut-carrier, of nut-cracking mechanism coacting therewith, a hopper located above the carrier and having a discharge-opening, a conductor leading from the opening to a position over the carrier, and a revoluble agitator mounted in the hopper and movable concentrically on an upright axis over the opening, for directing the nuts in said hopper into the opening.

88. In a nut-cracking machine, the combination with a base, of a rotatable carrier-drum mounted thereon and having a plurality of open-sided pockets, nut-cracking mechanism operating successively in the pockets during the revolution of the drum, a hopper supported above the carrier, a conductor leading from the lower portion of the hopper and delivering nuts to the pockets of the carrier prior to the movement of the cracking mechanism therein, agitating means located in the hopper, and means for driving the drum and operating the agitator.

89. In a nut-cracking machine, the combination with nut-cracking mechanism, of means for feeding nuts thereto including a hopper having a discharge-opening in its bottom, an upright shaft journaled above the opening, depending arms secured to the shaft and operating about the discharge-opening, and a nut-conduit leading from the opening to the cracking mechanism.

90. In a nut-cracking machine, the combination with nut-cracking mechanism, of means for feeding nuts thereto including a hopper having a discharge-opening in its bottom, a substantially upright shaft journaled above the opening, said shaft having a bore therethrough that is alined with the discharge-opening, and agitating means carried by the shaft.

91. In a nut-cracking machine, the combination with cracking mechanism, of means for feeding nuts thereto, including a hopper having a discharge-opening in its bottom, a cover for the top of the hopper, a vertical shaft journaled in the cover above the opening and having a bore therethrough that is alined with said opening, agitating means carried by the shaft and located in the hopper, and driving means for the shaft including gearing located at one side of said shaft and out of alinement with the bore thereof.

92. In a nut-cracking machine, the combination with nut-cracking mechanism, of means for feeding nuts thereto including a hopper having a discharge-opening, a gudgeon surrounding the opening, an agitator journaled on the gudgeon and operating in the hopper, and a spout leading from the hopper to the nut-cracking mechanism.

93. In a nut-cracking machine, the combination with nut-cracking mechanism, of means for feeding nuts thereto including a hopper having a discharge-opening in its bottom, an upstanding gudgeon surrounding the opening and located in the hopper, an upright agitator located in the hopper and having a journal-bearing revolubly mounted on the gudgeon, said agitator operating about the opening concentrically thereto, and means for operating the agitator.

94. In a nut-cracking machine, the combination with nut-cracking mechanism, of means for feeding nuts thereto including a hopper having an opening in its bottom, a sleeve secured in said opening and projecting above the same, constituting a gudgeon, a cover for the hopper, an upright shaft journaled in the cover and having a bore therethrough alined with the discharge-opening of the hopper, depending arms carried by the shaft and located within the hopper, and a ring mounted upon the lower end of one of the arms and journaled upon the gudgeon, said arm having an inwardly-extending lug.

95. In a nut-cracking machine, the combination with a base having an opening therethrough, of a nut-carrier drum journaled on the base above the opening, a receiving-hopper secured in the opening and inclosing the lower portion of the drum, nut-cracking mechanism movably mounted on and movable with the drum, a standard disposed at one side of the drum and mounted on the base, a hopper carried by the standard, and a delivery-spout leading from the bottom of the hopper to the upper portion of the drum.

96. In a nut-cracking machine, a nut-cracking jaw having a socket, and cutting-blades located longitudinally in said socket, said blades tapering in width toward their outer ends.

97. In a nut-cracking machine, a nut-cracking jaw having a socket, and cutting-blades located longitudinally in said socket, said blades tapering in width and thickness toward their outer ends.

98. In a nut-cracking machine, a nut-cracking jaw having a socket, and cutting-blades located in said socket, said blades having curved cutting edges and tapering in width from their inner to their outer ends.

99. In a nut-cracking machine, a nut-cracking jaw having a socket in its end provided with curved walls, and cutting-blades located longitudinally in said socket, said blades having curved cutting edges and tapering in width and thickness toward their outer ends, said blades furthermore terminating short of the outer end of the socket.

In testimony that I claim the foregoing as my own I have hereto affixed my signature in the presence of two witnesses.

WILLIAM GEBHARDT.

Witnesses:
CHAS. GRAEBNER,
E. B. ZACHRY.

---

Correction in Letters Patent No. 842,398.

It is hereby certified that in Letters Patent No. 842,398, granted January 29, 1907, upon the application of William Gebhardt, of San Antonio, Texas, for an improvement in "Nut-Cracking Machines," an error appears in the printed specification requiring correction, as follows: On page 11, line 40, the word "in" should be stricken out; and that the said Letters Patent should be read with this correction therein that the same may conform to the record of the case in the Patent Office.

Signed and sealed this 12th day of February, A. D., 1907.

[SEAL.]

F. I. ALLEN,
*Commissioner of Patents.* able with the drum, a standard disposed at one side of the drum and mounted on the base, a hopper carried by the standard, and a delivery-spout leading from the bottom of the hopper to the upper portion of the drum.

96. In a nut-cracking machine, a nut-cracking jaw having a socket, and cutting-blades located longitudinally in said socket, said blades tapering in width toward their outer ends.

97. In a nut-cracking machine, a nut-cracking jaw having a socket, and cutting-blades located longitudinally in said socket, said blades tapering in width and thickness toward their outer ends.

98. In a nut-cracking machine, a nut-cracking jaw having a socket, and cutting-blades located in said socket, said blades having curved cutting edges and tapering in width from their inner to their outer ends.

99. In a nut-cracking machine, a nut-cracking jaw having a socket in its end provided with curved walls, and cutting-blades located longitudinally in said socket, said blades having curved cutting edges and tapering in width and thickness toward their outer ends, said blades furthermore terminating short of the outer end of the socket.

In testimony that I claim the foregoing as my own I have hereto affixed my signature in the presence of two witnesses.

WILLIAM GEBHARDT.

Witnesses:
  CHAS. GRAEBNER,
  E. B. ZACHRY.

---

Correction in Letters Patent No. 842,398.

It is hereby certified that in Letters Patent No. 842,398, granted January 29, 1907, upon the application of William Gebhardt, of San Antonio, Texas, for an improvement in "Nut-Cracking Machines," an error appears in the printed specification requiring correction, as follows: On page 11, line 40, the word "in" should be stricken out; and that the said Letters Patent should be read with this correction therein that the same may conform to the record of the case in the Patent Office.

Signed and sealed this 12th day of February, A. D., 1907.

[SEAL.]

F. I. ALLEN,
*Commissioner of Patents.*

Correction in Letters Patent No. 842,398.

It is hereby certified that in Letters Patent No. 842,398, granted January 29, 1907, upon the application of William Gebhardt, of San Antonio, Texas, for an improvement in "Nut-Cracking Machines," an error appears in the printed specification requiring correction, as follows: On page 11, line 40, the word "in" should be stricken out; and that the said Letters Patent should be read with this correction therein that the same may conform to the record of the case in the Patent Office.

Signed and sealed this 12th day of February, A. D., 1907.

[SEAL.]

F. I. ALLEN,
*Commissioner of Patents.*